(12) United States Patent
Sun et al.

(10) Patent No.: US 7,609,888 B2
(45) Date of Patent: Oct. 27, 2009

(54) SEPARATING A VIDEO OBJECT FROM A BACKGROUND OF A VIDEO SEQUENCE

(75) Inventors: Jian Sun, Beijing (CN); Heung-Yeung Shum, Beijing (CN); Yin Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 11/173,882

(22) Filed: Jul. 1, 2005

(65) Prior Publication Data

US 2007/0003154 A1 Jan. 4, 2007

(51) Int. Cl.
*G06K 9/34* (2006.01)

(52) U.S. Cl. .................... 382/173; 382/164; 382/171; 382/266; 382/174

(58) Field of Classification Search .................. 382/173, 382/164, 171, 174, 266
See application file for complete search history.

(56) References Cited

U.S. PATENT DOCUMENTS

| | | | |
|---|---|---|---|
| 6,301,382 B1 * | 10/2001 | Smith et al. | 382/162 |
| 6,661,918 B1 * | 12/2003 | Gordon et al. | 382/173 |
| 6,731,799 B1 * | 5/2004 | Sun et al. | 382/173 |
| 7,187,783 B2 * | 3/2007 | Moon et al. | 382/103 |
| 7,330,586 B2 * | 2/2008 | Bhattacharjya | 382/162 |
| 2003/0133044 A1 | 7/2003 | Akiyama et al. | |
| 2007/0147703 A1 * | 6/2007 | Watson et al. | 382/284 |

OTHER PUBLICATIONS

Beucher, "Image Sementation and Mathematical Morphology", Watershed (online), May 10, 2005, retrieved May 15, 2007 from <<http://web.archive.org/web/20050510082130/http://cmm.ensmp.fr/~beucher/wtshed.html>>.
Shum, et al., "Pop-Up Light Field: An Interactive Image-Based Modeling and Rendering System", ACM, vol. 23, No. 2, Apr. 2004, 20 pgs.
Vass, et al., "Automatic Spatio-Temporal Video Sequence Segmentation", May 3, 2005, retrieved on May 15, 2007 from <<http://web.archive.org/web/20050503093202/http://meru.cecs.missouri.edu/people/vass/seg_icip_pap.pdf>>.
International Search Report for application No. PCT/US06/25997, mailed On Apr. 11, 2008 (9 pages).
U.S. Appl. No. 10/914,485, Eckard Rother et al., filed on Aug. 9, 2004, entitled, "Border Matting by Dynamic Programming."

* cited by examiner

*Primary Examiner*—Brian Q Le
*Assistant Examiner*—Edward Park
(74) *Attorney, Agent, or Firm*—Lee & Hayes, PLLC (57) ABSTRACT

Video object cutting and pasting is described. In one implementation, pre-segmentation of video frames into regions is performed prior to a 3-D graph cut segmentation. The 3-D graph cut segmentation uses temporal coherence and a global color model to achieve accuracy of video object boundaries. A 2-D local graph cut segmentation can then be used to refine the boundaries. The boundaries can be tracked within a user-selected sequence of windows and refined using a local color model.

18 Claims, 7 Drawing Sheets

SEPARATING A VIDEO OBJECT FROM A BACKGROUND OF A VIDEO SEQUENCE

BACKGROUND

Cutting and pasting of moving objects to and from video sequences has many applications in the field of video processing. Digital segmentation of objects, which allows such cutting and pasting, has become an increasingly popular research area in video processing.

Conventionally, cutting and pasting of video objects has been performed by chroma keying, which is also referred to as blue screen matting or "blue-screening." In chroma keying, foreground objects are video recorded in front of a solid-colored background, usually blue or green, and are then separated from the background using matting techniques that take advantage of the known background color. The simplicity of these techniques enables rapid foreground separation. Some systems even compute chroma keying in real time. However, these methods are limited to simple backgrounds of a solid color. Errors often occur when foreground objects contain colors similar to the background.

Some conventional approaches for video object cutout involve silhouette tracking. Although these existing methods can be applied to general backgrounds, to yield greater robustness in the tracking process, they use smooth curves that imprecisely and coarsely represent object boundaries. Since a coarse boundary descriptor cannot capture the fine details of a silhouette, these techniques are inadequate for most cut-and-paste applications. These rough boundary techniques can be interactively refined by auto keying, which provides a user interface for detailed boundary adjustment through spline editing. However, since each video frame must be individually modified by the user, the manual work needed to properly delineate the boundary details is prohibitive.

Recently, conventional video matting techniques have relaxed the solid color background requirement to allow smooth color changes instead of a single solid background color. The success of video matting in such scenarios depends on various techniques, such as how accurately trimaps can be propagated and how well Bayesian matting performs in each individual frame.

Video matting when the background is complex has two main difficulties for general video sequences. First, many videos contain fast motion, morphing silhouettes, and often-changing topologies, which are very challenging for state-of-the-art optical flow algorithms to bidirectionally propagate trimaps. Second, even if accurate trimaps can be obtained with considerable user interaction, the Bayesian matting technique often produces unsatisfactory results when the foreground/background contains complex textures or the foreground colors are similar to the background colors. In other words, when the background is more complex than just a simple solid color, then automatically determining where the visual edges of a video object are as the video object changes and moves during video play is a sophisticated and processor-intensive task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In view of the above, video object cutting and pasting is described. In one implementation, prior to a 3-D graph cut segmentation, video frames are pre-segmented into regions. The 3-D graph cut segmentation uses temporal coherence and a global color model to achieve accuracy of video object boundaries. A 2-D local graph cut segmentation can then be used to refine the boundaries. The boundaries can be tracked within a user-selected sequence of windows and refined using a local color model.

DETAILED DESCRIPTION

Overview

Systems and methods are described for automatically separating (i.e., "cutting") a moving and changing visual object from the sometimes complicated background of a moving video sequence (video clip), so that it can be pasted, for example, on a different moving background. Importantly, the systems and methods can preserve the fine outer border details of the video object being cut out.

The systems and methods can capture complex shape deformations with user input of only a few key frame mattes, using a 3-dimensional (3-D) graph cut segmentation that has improved features over conventional techniques. Moreover, using local color models, video object boundaries are located correctly even when colors are ambiguous or contrast between designated foreground and background is low. A bidirectional feature tracking technique is designed to accurately track visual regions using local color models. A resulting cut out video object sequence is ready to be composed onto other backgrounds.

Exemplary System

Figure 1:
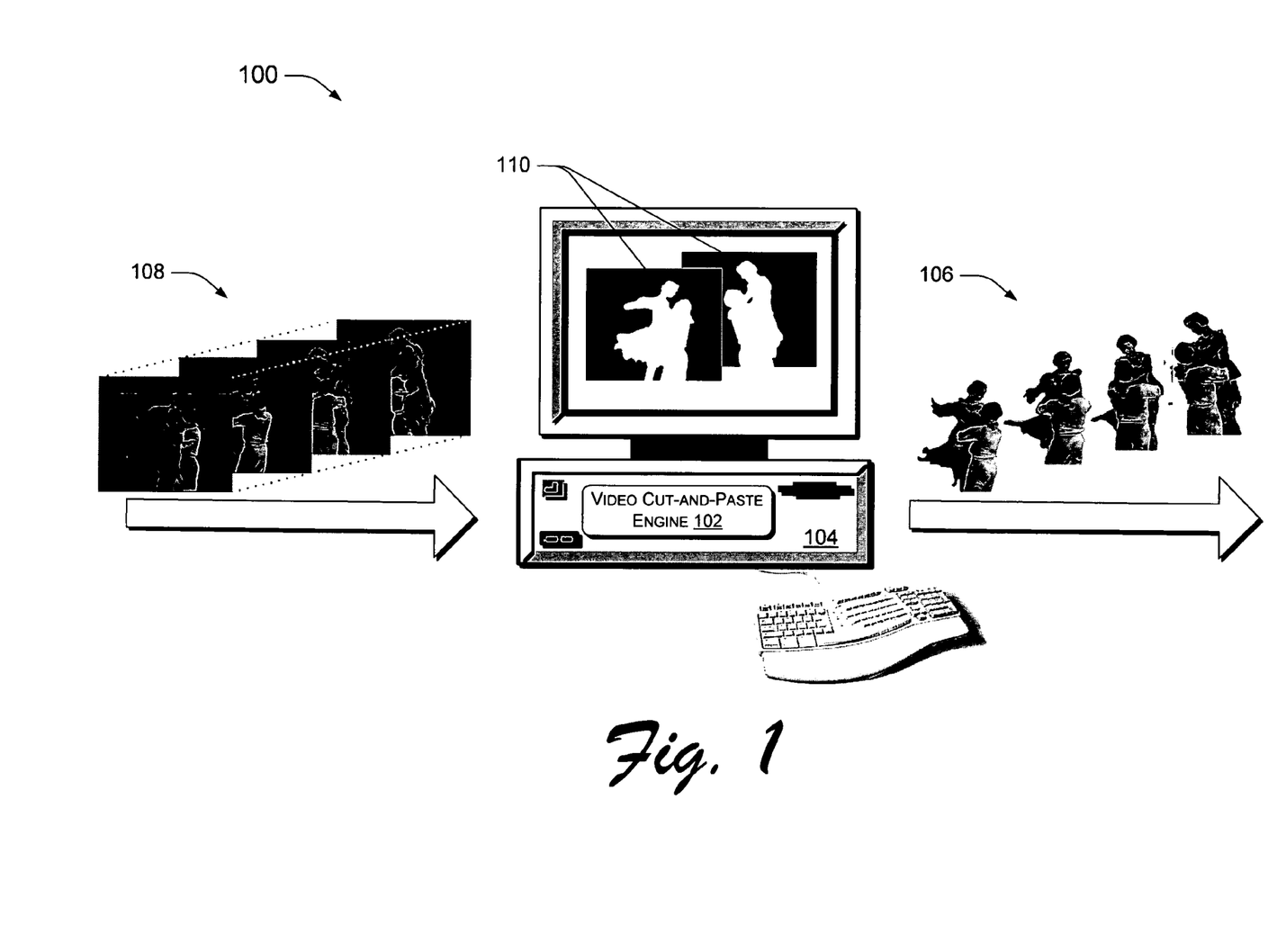
FIG. 1 is a diagram of an exemplary video cut-and-paste system.

FIG. 1 shows an exemplary system 100, in which a video cut-and-paste engine 102 resides in a computing device 104. The video cut-and-paste engine 102 can cut a temporally sequenced video object 106 (in this case, moving dancers) out of a video clip 108 so that the video object 106 can be pasted into a different moving background. The system 100 performs such a "graph cut" by differentiating (i.e., "segmenting") the video object 106 to be cut from the surrounding background "matte" 110 in a manner that is faster, easier to use, and more efficient than conventional techniques.

The 3-D graph cut operation cuts the video object 106 from a temporal sequence of 2-dimensional (2-D) surfaces (video frames) that represent an interval of time—the video clip 108—during which the video object 106 moves and may change its footprint on the frame from one 2-D frame to the next. The 3-D graph cut is different from a 2-D graph cut, in which a visual object is separated from a single 2-D surface like cutting the object from a piece of paper. The "three dimensions" of the 3-D graph cut refer to two spatial dimensions (of a video frame) moving through a third temporal dimension (i.e., being played), rather than the three spatial dimensions of length, width, and depth. The exemplary techniques described herein need not be limited to a 3-D graph cut, however, but aspects could also be applied to a 4-dimensional graph cut, in which, for instance, a holographic object is cut from its surroundings in space and inserted into a different space with different surroundings.

The systems and methods described herein have the advantage of generating an accurate binary segmentation before applying coherent matting. That is, a modified coherent matting uses the binary segmentation as a prior for producing the alpha matte of the video object 106 being cut. The coherent matting can generate better results than conventional Bayesian matting, for example, because it fully exploits the information in the binary segmentation with a regularization term for the alpha matte. Moreover, in providing a binary video segmentation, an exemplary system obtains more accurate results and utilizes an easier-to-use user interface (UI) for boundary refinement than the conventional techniques of contour tracking and trimap propagation.

One implementation of the subject matter additionally uses a 2-D image segmentation method by which accurate object boundaries can be easily obtained using simple user interaction combined with a graph cut algorithm.

The systems and methods described herein extend conventional pixel-level 3-D graph cutting to a region-based 3-D graph cutting in order to handle video objects 106 instead of just pixels. Exemplary local refinement methods use a tracking feature as well.

Figure 2:
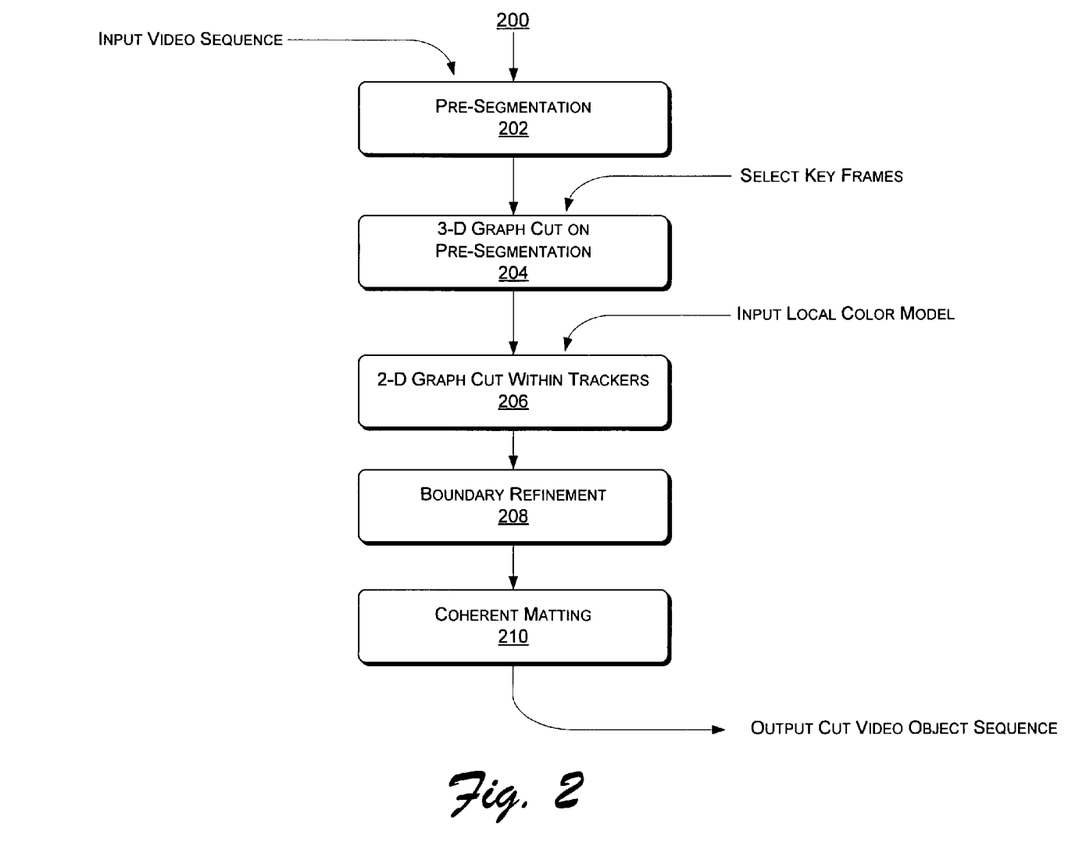
FIG. 2 is a diagram of an overview of an exemplary video object cut-and-paste process.

FIG. 2 shows an overview 200 of one implementation of the exemplary graph cutting process implemented by video-cut-and-paste engine 102. In the overview 200, a pre-segmentation 202 occurs before the 3-D graph cut 204. A "watershed" partitioning (i.e., using the "watershed algorithm") is performed on the input video sequence. This greatly expedites the segmentation, i.e., the video cut and paste operations are greatly accelerated by performing this watershed segmentation before the 3-D graph cut occurs. This watershed partitioning consists of a rough binary pre-segmentation into graph regions using an energy evaluation.

Next, the 3-D graph cut 204 uses a small number of model video frames selected from the video clip as an initial starting point for the segmentation process. These model video frames may be selected for their efficacy in showing contrast between the video object 106 and the background. The exemplary graph cutting process then automatically forms inter-frame connections across corresponding "candidate" image regions in adjacent video frames to preserve accurate object segmentation as the object moves and changes through time across video frames.

A user can further refine the automatically generated video object boundaries with a local 2-D graph cut 206 using a local color model. Bidirectional feature tracking between key frames can also be provided that allows the user to make local corrections to the automatically generated video object boundary.

Manual tools for boundary refinement 208 are also provided that override the automatic segregation in order to specify or correct fine detail in an object boundary.

An exemplary modified coherent matting process 210 automatically generates a sequence of mattes for the frames of the video clip 108. The exemplary modified coherent matting process 210 extracts the specified video object 106 from the video clip 108 using the sequence of mattes and extracts the foreground colors of the video object.

Other features include map saving, by which a user can save the user's interaction and a cutting and pasting setup to file, for later use and modification; and object pasting, by which the user can place the segmented object into a new background.

Exemplary Engine

Figure 3:
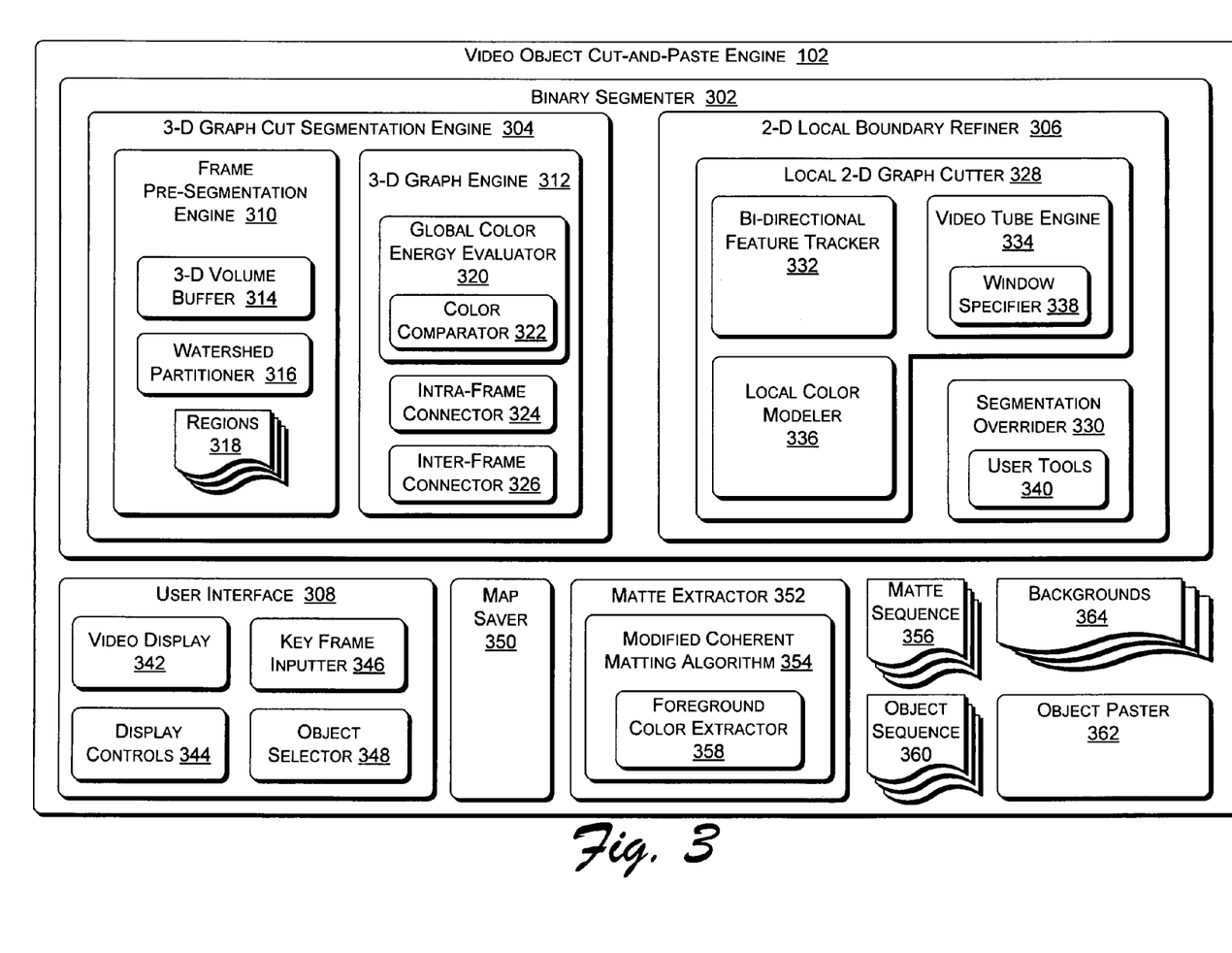
FIG. 3 is a block diagram of an exemplary video cut-and-paste engine.

FIG. 3 shows the video cut-and-paste engine 102 of FIG. 1 in greater detail. The video cut-and-paste engine 102 illustrated in FIG. 3 is meant to provide one example arrangement for the sake of overview. Many other arrangements of the illustrated components, or similar components, are possible. Such a video cut-and-paste engine 102 can be executed in hardware, software, or combinations of hardware, software, firmware, etc.

The exemplary engine 102 includes a binary segmenter 302 that aims to find the boundary between a video object 106 and its background. That is, the binary segmenter 302 aims to determine for each pixel, whether the pixel is in the foreground (the video object 106 being cut) or in the background (part of the matte). Ideally, a perfect cut or "segmentation" would be between a pixel in the video object 106 and the next adjacent pixel outside the video object 106. However, the exemplary engine 102 gains speed and accuracy over conventional techniques by considering regions of the temporally changing video frames of a 3-D video volume instead of individual pixels.

The binary segmenter 302 includes a 3-D graph cut segmentation engine 304, to perform the gross processing of finding the video object boundary; and a 2-D local boundary refiner 306 for refining the results obtained by the 3-D graph cut segmentation engine 304. Both of these components interact with a user interface 308.

The 3-D graph cut segmentation engine 304 further includes a frame pre-segmentation engine 310 and a 3-D graph engine 312. The frame pre-segmentation engine 310 further includes a 3-D volume buffer 314, a watershed partitioner 316, and a storage area for the regions 318 determined by the watershed partitioner 316. The 3-D graph engine 312 further includes a global color energy evaluator 320, an intra-frame connector 324, and an inter-frame connector 326. The global color energy evaluator 320 may further include a color comparator 322.

The 2-D local boundary refiner 306 can include a local 2-D graph cutter 328 and a segmentation overrider 330. The local 2-D graph cutter 328 further includes a bidirectional feature tracker 332, a video tube engine 334, and a local color modeler 336. The video tube engine includes a window specifier 338. The segmentation overrider 330 typically includes user tools 340, for example, user interface brush tools, for designating foreground and background areas of a video frame. The user interface 308 can include a video display 342, display controls 344, a key frame inputter 346, and an object selector 348.

A map saver 350 can persevere a binary segmentation obtained by the binary segmenter 302. This may include boundary modifications that the user has performed with some degree of manual intervention with the local 2-D graph cutter 328 and the user tools 340, etc.

Using the binary segmentation results from the binary segmenter 302, the matte extractor 352 can apply a modified coherent matting algorithm 354 in order to obtain the alpha mattes of each frame in the video clip 108, that is, a "matte sequence" 356. A foreground color extractor 358 extracts the 3-D video object 106 as an object sequence 360. An object paster 362 may place the object sequence 360 into one of multiple new backgrounds 364.

In one implementation, the operation of the exemplary video cut-and-paste engine 102 can be summarized as follows. Pre-segmentation regions 318 of video frames are determined by the watershed partitioner 316. The 3-D graph cut segmentation engine 304 then applies segmentation to the pre-segmentation regions of the spatial-temporal video volume, which can be held in a buffer 314. The 3-D graph engine 312 connects the pre-segmentation regions 318 in a manner that preserves temporal coherence of a video object 106. The 2-D local boundary refiner 306 can take this initial segmentation result and allow the user to specify regions 318 for local refinement in which the local 2-D graph cutter 328 has a local color modeler 336 that utilizes local colors instead of colors from the entire background.

A more detailed description of the video object cut-and-paste engine 102 now follows. In a typical scenario, the user first selects a few key frames from the video clip 108 using the key frame inputter 346 and provides their precise foreground/background segmentation using the object selector 348, which may include a conventional image snapping tool. In one implementation, the engine 102 asks for a key frame sample at ten-frame intervals and generates the background mattes of the frames in-between, but the sampling rate may vary according to object motion in the particular video clip 108. For slower moving or deforming objects, a lower sampling rate may be used.

The 3-D graph cut segmentation engine 304 acts on the spatial temporal volume of the video clip 108, which can be stored in the 3-D volume buffer 314. To make the optimization process tractable, the frame pre-segmentation engine 310 pre-segments each frame in the video clip 108 into a number of atomic regions 318 using a watershed technique, such as a Vincent and Soille watershed algorithm. The 3-D graph engine 312 builds a 3-D graph based on these atomic regions 318. An alternative pre-segmentation technique can be used, such as Mortensen and Barrett's tobogganing. In either case, the 3-D graph cut segmentation engine 304 forms temporal connections that preserves a set of region candidates from frame to frame and therefore embeds temporal consistency without explicit motion estimation.

Figure 4:
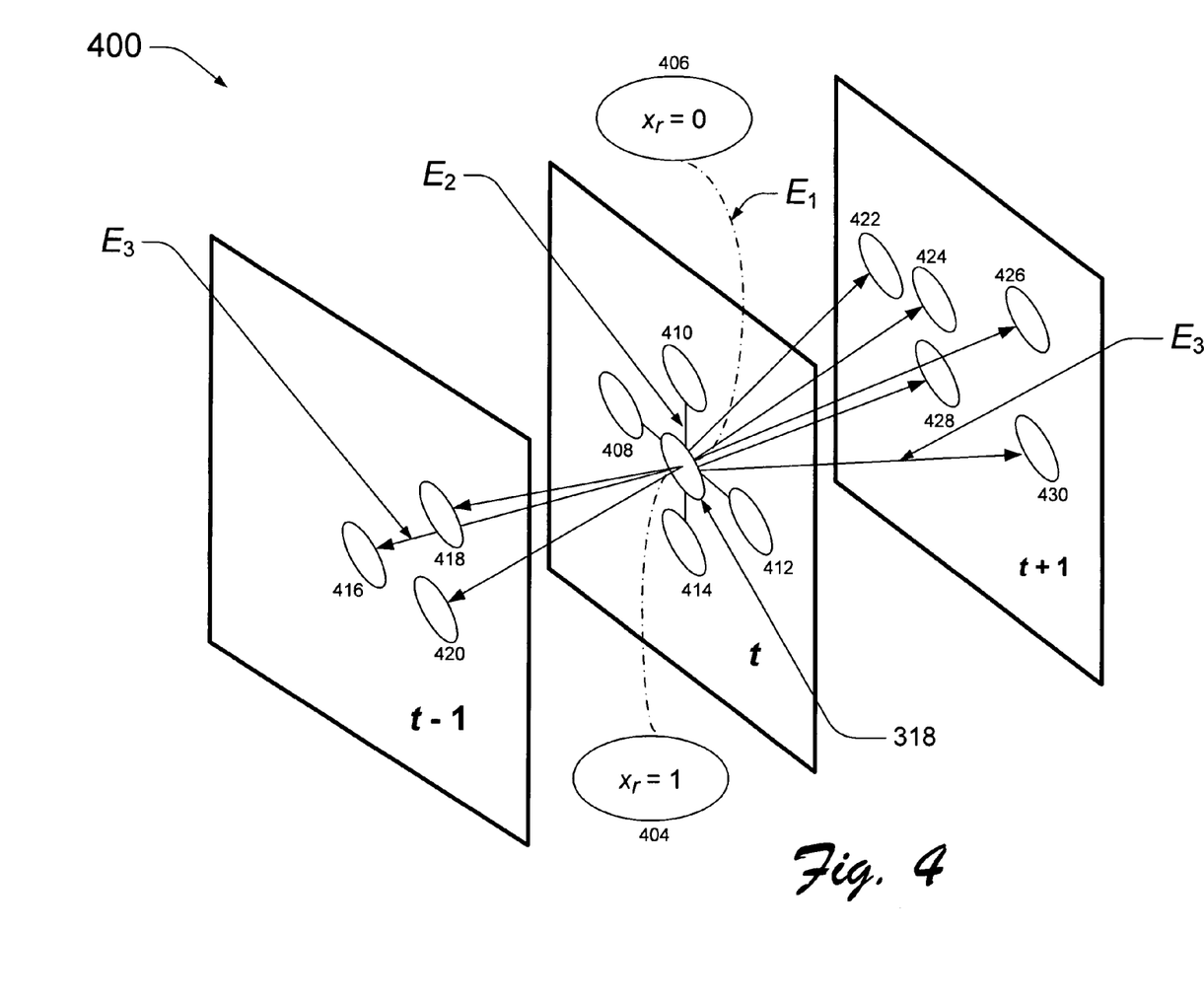
FIG. 4 is a diagram of exemplary 3-D graph construction.

FIG. 4 shows an overview of exemplary construction of a 3-D graph 400 from which the 3-D video object 106 can be segmented and cut out. In one implementation, for a region r 318 the 3-D graph engine 312 constructs the 3-D graph 400 using three energy quantities. First, the 3-D graph engine 312 connects the region 318 to foreground virtual nodes (e.g., 404) and background virtual nodes (e.g., 406) according to an energy term $E_1$. Second, the intra-frame connector 324 connects the region 318 to neighboring regions (e.g., 408, 410, 412, 414) within a single frame (t) according to an energy term $E_2$. Then, the inter-frame connector 326 connects the region 318 to candidate regions on adjacent frames with an energy term $E_3$ (e.g., candidate regions 414, 416, and 418 on previous frame t−1; and candidate regions 422, 424, 426, 428, and 430 on succeeding frame t+1). A candidate region, then, represents a region on an adjacent frame that might turn out to be the current region 402 at a different point in time (i.e., on an adjacent video frame).

Returning to the engine components of FIG. 3, the 3-D graph engine 312 builds the 3-D graph 400 between each pair of selected key frames, building on the "atomic" regions 318 obtained by the frame pre-segmentation engine 310, instead of individual pixels as in conventional techniques. The 3-D graph engine 312 performs the segmentation by using a color comparator 322 to compare the color consistency of each region 318 with the foreground/background color distribution in key frames, and then maximizing the color differences between regions across the foreground/background boundary of the video object 106. In addition, the 3-D graph engine 312 takes advantage of the temporal coherence embedded in the 3-D graph by optimizing using the three energies. In practice, much of the video object's silhouette can be accurately located by the 3-D graph cut segmentation engine 304.

In even greater detail, the 3-D graph engine 312 assigns a unique label $x \in \{1(\text{foreground}), 0(\text{background})\}$ to each region 318. The regions 318 in key frames already have labels, e.g., from the object selector 348, while the 3-D graph engine 312 assigns labels to regions in other frames.

The 3-D graph engine 312 constructs a 3-D volume G=(V,A) bounded by two successive key frames from the key frame inputter 346. The node set V contains atomic regions (e.g., 318) generated by the watershed partitioner 316. The arc set A contains two kinds of arcs: intra-frame arcs $A_I$ connecting nodes within one frame, and inter-frame arcs $A_T$ connecting nodes across adjacent frames.

To construct the intra-frame arcs $A_I$, the intra-frame connector 324 connects each region $r_t$ 318 to each of the adjacent regions (e.g., 402, 404, 406, and 408) in the same frame: ($I_t$). To construct the inter-frame arcs $A_T$, the inter-frame connector 326 connects each region $r_t$ 318 to each candidate region (e.g., 422, 424, 426, 428, 430) in the adjacent frame ($I_{t\pm1}$) that lies within a given radius (typically 15 pixels), excluding obviously unrelated regions whose mean color differs from that of region r, 318 by more than a threshold $T_c$ (typically 30 pixels). To handle regions with various shapes, such as an "L" shape or thin and long regions, the adjacency between regions is computed by morphological dilation instead of Euclidean distance between region centers. The 3-D graph engine 312 keeps a set of these candidate connections for possible correspondences on adjacent frames, and the optimization provided by the color comparator 322 decides which should be cut off. Keeping the candidate connections between possible corresponding regions across frames leads to greater robustness than traditional tracking methods that determine only one correspondence.

The 3-D graph generator 312 labels corresponding regions by having the color comparator 322 minimize an energy function defined on the 3-D graph G as in Equation (1):

$$E(X) = \sum_{r \in V} E_1(x_r) + \lambda_1 \sum_{(r,s) \in A_I} E_2(x_r, x_s) + \lambda_2 \sum_{(r,s) \in A_T} E_3(x_r, x_s), \quad (1)$$

where $x_r$ is the foreground/background label of region r 318, and $X=\{x_r : \forall_r\}$. The first term is the "likelihood energy" $E_1$, which represents the conformity of the color of region r 318 to the foreground/background color model built from the color information in the key frames. The second and third terms are the "prior energies," $E_2$ and $E_3$. $E_2$ represents color differences between two adjacent regions in the same frame, and is used by the intra-frame connector 324 to encourage two similar adjacent regions to stay together within the foreground or within the background. The third term $E_3$ represents color differences between two adjacent regions in two adjacent frames, and is used by the inter-frame connector 326 to embed temporal coherence in the graph cut optimization process through inter-frame arcs $A_T$. The inter-frame connector 326 forms temporal connections between frames, i.e., by connecting a single region in one frame to multiple candidate regions in succeeding frames, with several connections maintained in a final optimization.

The global color energy evaluator 320 samples colors in key frames to build the foreground/background color models for $E_1$. In one implementation, the global color energy evaluator 320 uses Gaussian mixture models (GMMs) to describe the foreground/background color distributions. The mth component of the foreground GMMs is denoted as $(w_m^f, \mu_m^f, \Sigma_m^f)$ representing the weight, the mean color, and the covariance matrix. The global color energy evaluator 320 uses M components to describe the foreground or background colors, hence $m \in [1,M]$. Typically M=6.

For a given color c, its distance to the foreground GMMs is defined as in Equation (2):

$$d^f(c) = \min_{m \in [1,M]} [\hat{D}(w_m^f, \Sigma_m^f) + \overline{D}(c, \mu_m^f, \Sigma_m^f)], \quad (2)$$

where, as shown in Equation (3):

$$\hat{D}(w, \Sigma) = -\log w + \frac{1}{2} \log \det \Sigma, \quad (3)$$

and where, as shown in Equation (4):

$$\overline{D}(c, \mu, \Sigma) = \frac{1}{2}(c-\mu)^T \Sigma^{-1} (c-\mu). \quad (4)$$

For a region r 318, its distance to the foreground GMMs is defined as the expectation of the distance of all pixels inside the region, denoted as $\langle d^f \rangle_r$. The distance $\langle d^b \rangle_r$ to the background color is defined similarly. Then, the likelihood energy $E_1(x_r)$ is defined as in Table (1):

TABLE (1)

| Likelihood Energies | | | |
|---|---|---|---|
| | $r \in \{F\}$ | $r \in \{B\}$ | $r \notin \{F\} \cup \{B\}$ |
| $E_1(x_r = 1)$ | 0 | ∞ | $\langle d^f \rangle_r$ |
| $E_1(x_r = 0)$ | ∞ | 0 | $\langle d^b \rangle_r$ |

{F} and {B} are sets of foreground regions and background regions, respectively, in key frames, whose labels are input. Assignments of 0 and ∞ to $E_1$ enforce these hard constraints in the optimization.

The two energies $E_2$ and $E_3$ are defined with respect to color similarity between two regions r and s as in Equation (5):

$$E(x_r, x_s) = |x_r - x_s| \cdot e^{-\beta \|c_r - c_s\|^2} \quad (5)$$

where $\|c_r - c_s\|$ is the $L_2$ norm of the RGB color difference.

The robust parameter $\beta$ weights the color contrast, and can be set to $\beta = (2\langle \|c_r - c_s\|^2 \rangle)^{-1}$ where $\langle \cdot \rangle$ is the expectation operator. The global color energy evaluator 320 computes $\beta$ separately for $E_2$ and $E_3$. The factor $|x_r - x_s|$ allows the energy to be considered only for connections across the segmentation boundary. The prior energies $E_2$ and $E_3$ are penalty terms when adjacent nodes are assigned with different labels.

The 3-D graph engine 312 globally minimizes the objective function of Equation (1) by using an efficient graph cut algorithm, and the resulting labels for each region determine a segmentation in the video volume.

In the 3-D graph construction, the edge cost of the arc to virtual foreground (or background) node in the graph is $E_1(0)$ ($E_1(1)$), and the edge cost of the intra-frame or inter-frame arc is $e^{-\beta \|c_r - c_s\|^2}$. The arcs between nodes $c_r$-$c_s$ that have similar colors should have high cost.

In one implementation, the global color energy evaluator 320 fixes default parameters to $\lambda_1 = 24$, $\lambda_2 = 12$. With these values, the 3-D graph cut segmentation engine 304 can compute the boundary of a video object 106 successfully at a reasonable speed.

Since the global color energy evaluator 320 builds the foreground/background color distributions globally from the key frames, the 3-D graph cut segmentation result can be poor in areas where the foreground color matches the background color of a different part of the video clip 108 (and vice versa). Thus, the 2-D local boundary refiner 306 includes a video tube engine 334 that allows the user to apply very localized boundary refinement. A "video tube" is a small area of the video frame footprint across time (a small portion of the displayed, moving video) in which only local color models are used in graph cut segmentation. By isolating local colors, the segmentation boundary can be improved significantly. The video tube engine 334 includes a window specifier 338 that allows the user to specify the area of the video frame in which the localized boundary refinement will take place. In one implementation, the user draws a rectangle (a window) that gets propagated across frames and that limits segmentation to within its own boundaries. Drawing a rectangle via the window specifier 338 can be accomplished via the user interface 308 and the display controls 344.

In one implementation, the window specifier 338 of the video tube engine 334 defines a video tube as rectangular windows $\{W_t\}_{t=1}^T$, i.e., a subportion of a video frame across T frames. To specify a video tube, the user only needs to select two key windows $W_1$ and $W_T$, which are the first and last windows of the video tube being selected. The remaining windows in between are automatically located by the bidirectional feature tracker 332.

In one implementation, the video tube engine 334 determines that there is at least one key frame in between $W_1$ and $W_T$ such that the local color modeler 336 can obtain local foreground/background color models for refinement. Also, the video tube engine 334 determines that the tube boundary is correct at the segmentation borders (between the foreground and the background at the edge of the video object 106), since the intersection points provide hard constraints in the optimization.

After the 2-D local boundary refiner 306 performs the tracking, the local 2-D graph cutter 328 applies a constrained 2-D pixel-level graph cut segmentation to each video tube window using the local foreground and background color models constructed from the corresponding video tube windows on the key frame(s). Finally, the 2-D local boundary refiner 306 seamlessly connects this refined segmentation result from each video tube to the existing video object boundary adjacent to the video tube window.

Figure 5:
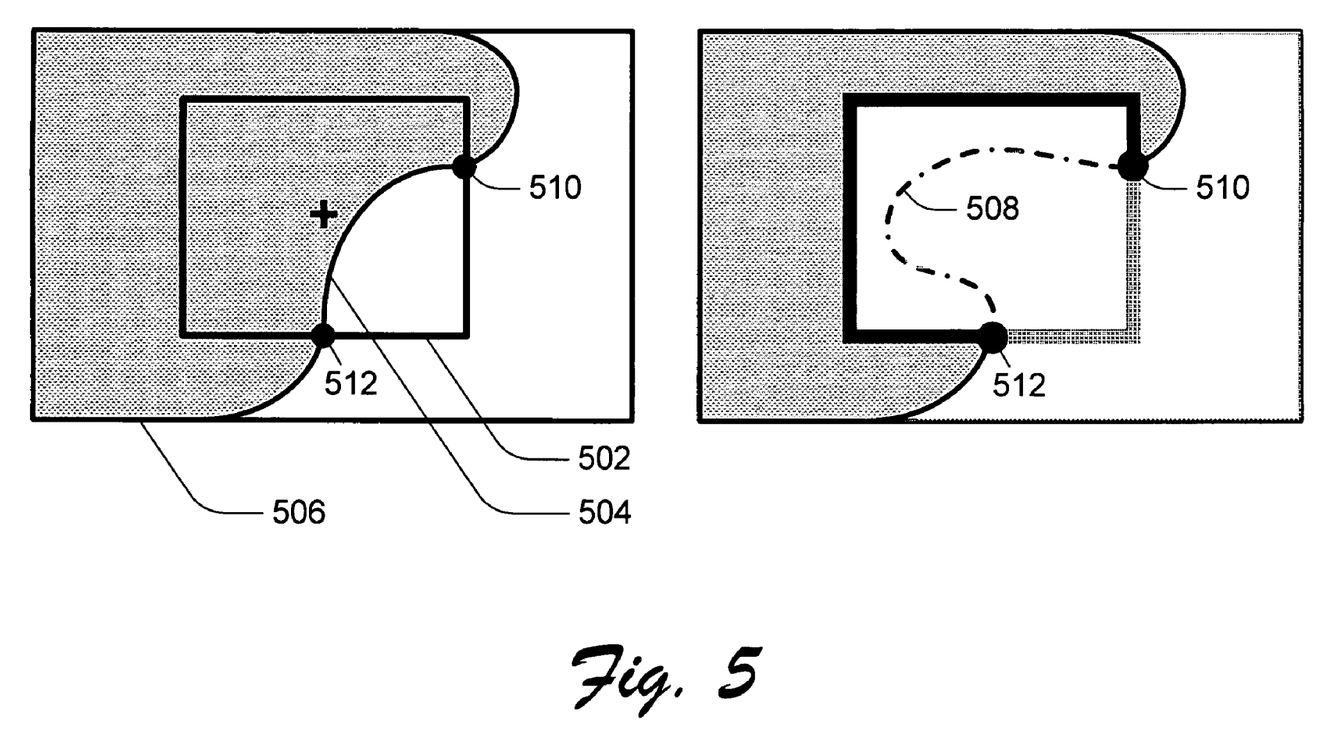
FIG. 5 is a diagram of an exemplary technique for refining boundaries of a video object.

FIG. 5 shows the exemplary 2-D boundary refinement—using video tubes—just described. The video tube window 502 is placed by the user on a boundary 504 of an existing segmentation result 506. The local 2-D graph cutter 328 performs segmentation using local colors found by the local color modeler 336. In this boundary refinement, the outermost pixels on the edge of the window 502 are labeled as foreground/background hard constraints according to the existing segmentation result, so that whatever is determined for the interior pixels of the window 502 will seamlessly connect with the existing segmentation result 506 from the 3-D graph cut segmentation. At the outset of window selection, the foreground/background status of each interior pixel of the window 502 is uncertain and to be determined by relationship to a more refined boundary 508. This 2-D graph cut segmentation result, the refined boundary 508 (shown as a dashed line), is used to replace previous segmentation boundary 504. The two intersection points 510 and 512 where the video tube window 502 intersected the previous segmentation boundary 504 remain in their same locations, but the rest of the refined boundary 508 can be different than the previous boundary 504.

Bidirectional Feature Tracking

The bidirectional feature tracker 332 will now be described in greater detail. Given the two key windows $W_1$ and $W_T$, the first window and the last window of a video tube, the bidirectional feature tracker 332 tracks the position of the window in the intermediate frames. The sizes of $W_1$ and $W_T$ can be different and adjusted by the user. Before tracking, the windows in between are linearly interpolated (both position and size) from $W_1$ and $W_T$.

The video tube engine 334 denotes $p_t$ as the center position of each window $W_T$ in the video tube. The video tube engine 334 also defines a search range $S_t$ for the position of each window. All positions $\{p_t\}_{t=2}^{T-1}$ of windows can be solved by minimizing the following objective function shown in Equation (6):

$$\{p_t^*\} = \arg\min_{\{p_t\}} \sum_{t=2}^{T-1} \min(D(p_t, p_1), D(p_t, p_T)) + \sum_{t=2}^{T} \{\eta_1 \|(p_t - p_{t-1}) - (\hat{p}_t - \hat{p}_{t-1})\| + \eta_2 D(p_t, p_{t-1})\},$$

(6)

where $D(p_{t1}, p_{t2})$ is the sum of squared color distances between two windows $W_{t1}$ and $W_{t2}$ in their overlapping region when their centers $p_{t1}$ and $p_{t2}$ are aligned. The terms $\hat{p}_{t-1}$ and $\hat{p}_t$ are the positions of windows $W_{t-1}$ and $W_t$ before optimization, which is computed by linear interpolation. In one implementation, $\eta_1=0.1$ and $\eta_2=1$.

The first term in equation (6) is designed to optimize the color consistency of the window with respect to the key windows. The video tube engine 334 selects the best matching key window to compute this cost, to allow for feature changes over time. The second term enforces the smoothness of the video tube. The third term is for minimizing the color differences between adjacent windows. Note that the positions of key windows are fixed in this optimization process, since they have been placed by the user. The tracking is referred to as "bidirectional" because each window receives information from two key windows in two directions.

In one implementation, the objective function of Equation (6) can be optimized using a dynamic programming (DP) algorithm. The bidirectional feature tracker 332 can use a multiscale method for the optimization. First, the bidirectional feature tracker 332 builds a Gaussian pyramid for each frame in the video clip 108, and each higher level has half the frame size of its immediate lower level. The bidirectional feature tracker 332 scales the window's position and size accordingly. Then it performs optimization at each level beginning from the top of the pyramid, within the search range $S_t$ centered at the optimized location in the preceding level. For the top level, the bidirectional feature tracker 332 linearly interpolates the initial position of $W_t$ from the key windows. Typically, for an NTSC video (720×480 pixels) there are L=4 levels and $S_t$ is a 7×7 square window at each level.

Once a video tube is located, the 2-D local boundary refiner 306 performs a 2-D graph cut segmentation within each window to refine the existing segmentation boundaries. The 2-D graph is constructed at the pixel level, as shown in Equation (7):

$$E(X) = \sum_{i \in V'} E_1(x_i) + \lambda'_1 \sum_{(i,j) \in A'_l} E_2(x_i, x_j)$$

(7)

where $x_i$ is the label of the pixel i, V' are all pixels being tracked, and $A'_l$ is the eight-neighbor relationship between pixels. $E_1$ and $E_2$ have similar definitions as in Equation (1) except that regions are now replaced by pixels. In one implementation, the value of $\lambda'_1$ is typically set to 10.

In order to seamlessly embed the refinement into the existing segmentation, the local 2-D graph cutter 328 automatically generates a foreground and background hard constraint according to the existing segmentation result. As shown in FIG. 5, the labels of all pixels inside the window are solved by the local 2-D graph cutter 328, except for the pixels on the window's boundary. These pixels are marked as foreground hard constraints if in the foreground of the existing segmentation. Otherwise, they are marked as background hard constraints. Because of these hard constraints, the local 2-D graph cutter 328 produces a result inside the window that is seamlessly connected to existing boundaries just outside of the window, as shown in FIG. 5.

As mentioned, there must be at least one key frame inside a video tube. The video tube engine 334 collects the pixels inside the window in the key frames to compute the foreground/background GMM models for the video tube for the $E_1$ term above. Compared to the global color models used by the 3-D graph cut segmentation engine 304, the local 2-D graph cutter 328 uses more accurate color models in local windows and obtains significantly improved results, that is why it is used for 2-D local boundary refinement.

Figure 6:
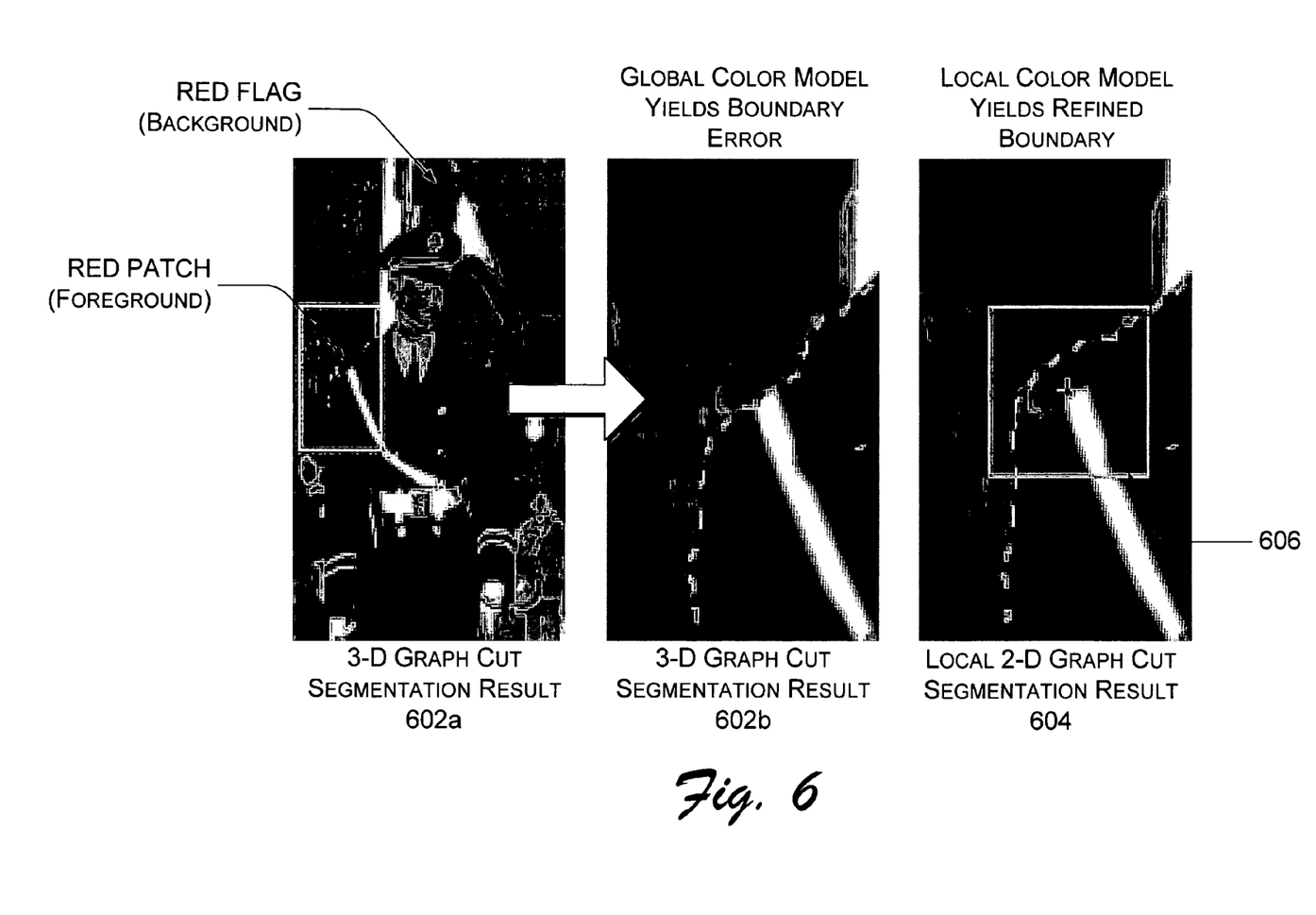
FIG. 6 is a diagram of exemplary 3-D and 2-D segmentation results.

FIG. 6 shows segmentation results before and after local refinement. The refinement yielded by the 2-D local boundary refiner 306 over the 3-D graph cut segmentation engine 304 does not require accurate user interactions, in fact the user only has to place the video tube windows on frames in such a manner as to exclude irrelevant colors. In frame 602a, a patch on the shown person's uniform has a similar red color as a flag in the background. Because the 3-D graph cut segmentation engine 304 uses a global color energy evaluator 320, a boundary error, as shown in frame 602b, may be introduced as the 3-D graph engine 312 decides that the red patch is part of the background-because the patch is on the visual outer edge of the uniform and has a strikingly different color from the rest of the green uniform. Indeed, the global color energy evaluator 320 considers red a strong background color because of the prominent presence in the frame 602a of the red flag. In frame 604, however, the 2-D local boundary refiner 306 uses a local color modeler 336 within the smaller rectangular video tube window 606. With a local color model that excludes irrelevant global color information, the boundary is thus more precisely refined.

Exemplary Segmentation Overrider

When there are ambiguous edges around the actual video object boundary or the contrast of the boundary is very low, the local 2-D graph cutter 328 may not be able to produce a correct video object boundary. This may be especially true for thin visual structures, such as in a video of human fingers, where the fine structure may not be automatically differentiated. A segmentation overrider 330 may be provided to overcome these difficulties manually. In one implementation, the segmentation overrider 330 has user tools 340 that allow the user to directly control the object boundary with great precision using, for example, two override brushes for identifying definite foreground and definite background regions. Moreover, user's overriding operation can be saved to disk and loaded for later use.

Once the exemplary binary segmenter 302 has segmented the video clip 108, the matte extractor 352 extracts the video object 106 for pasting. In one implementation, the matte extractor 352 adopts a modified coherent matting algorithm 354 to compute a fractional alpha matte for the video object boundary. In one implementation, the matte extractor 352 improves conventional Bayesian matting by introducing a regularization term for the alpha. Hence, it produces an alpha matte that complies with the prior binary segmentation boundaries, and performs well even when foreground/background colors are similar.

The matte extractor 352 processes uncertain boundary regions by dilating the binary video object boundary, typically by 10 pixels. For small holes or thin gaps in the foreground, this dilation may result in no background colors to be sampled nearby. In this case, the matte extractor 352 instead samples background colors from neighboring frames.

The matte extractor 352 obtains the video object's alpha mattes to make up the matte sequence 356 and has a foreground color extractor 358 to obtain foreground colors for the video object sequence 360. Then, the object paster 362 can paste the cut out video object sequence 360 onto a new background 364.

Experimental Results

In example experiments, tests were performed on a 3.1 GHz computer. Source video clips 108 were taken with a DV camera in progressive scan mode at a 12.5 frames/sec rate. Each video clip 108 was split into about 30 frames per segment, and each segment was loaded and processed individually. Key frames were usually sampled at every ten frames, while some video clips 108 needed denser samples due to fast motion or shadow changes.

The processing time was about half an hour for each of the abovementioned segments of the video clip 108. In one example experiment, about 20% of this time was taken by the frame pre-segmentation engine 310 for preprocessing and other computation; about 40% of the time was taken by the video tube engine 334 for tracking and adjustment, and another 40% of the time was taken by the segmentation overrider 330 for overriding operations.

Saving Intermediate Results

Pre-processing is typically performed only once for each segment and the results from the watershed partitioner 316 and 3-D graph cut segmentation engine 304, in general, can be saved by the map saver 350 and reused as desired. The 3-D graph engine 312 is typically not responsible for much of the processing time used.

Exemplary Methods

Figure 7:
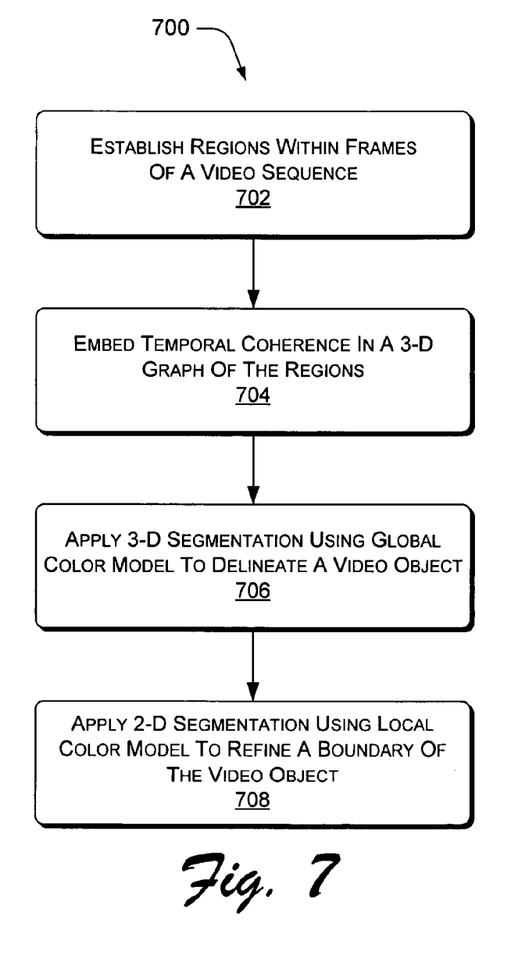
FIG. 7 is a flow diagram of an exemplary method of segmenting a video object from a video sequence.

FIG. 7 depicts an exemplary method 700 of segmenting a video object from out of a video sequence. In the flow diagram, the operations are summarized in individual blocks. Parts of the exemplary method 700 may be performed by hardware, software, or combinations of both, for example, by components of the exemplary video cut-and-paste engine 102.

At block 702, regions are established within the frames of a video sequence. A frame pre-segmentation engine 310, for example, may apply a watershed algorithm in order to render the video frames into atomic regions. Using regions instead of pixel has many advantages. For one thing, working with regions may require less processing power and speed up video cut and paste operations. Since a given region may change position, shape, and color, etc., during play of the video sequence, one challenge for defining the boundaries of such a moving object is tracking the region accurately through the frames of the video sequence.

Thus, at block 704, temporal coherence is embedded in a 3-D graph of the regions. A 3-D graph engine 312, for example, may build the 3-D graph not only by forming associations between adjacent regions on the same frame, but also between a region and possible "candidate" regions on temporally adjacent video frames. This leads to consistency in identifying a given region between frames of the sequence, and this in turn leads to a sharper delimiting of video objects in the video sequence, since there is less uncertainty as the region moves and morphs across multiple frames about whether a given region is part of the video object 106 or instead, part of the background.

At block 706, a 3-D graph cut segmentation is applied based on a global color model. A 3-D graph cut segmentation engine 304, for example, may begin to find the visual boundaries of a video object by using a few key frames, i.e., selected as good models of the video object to be cut out. Working from these key model frames to other frames in the video sequence, a global color model allows the visual edges of the video object to be distinguished from background colors. Since the 3-D graph is built on regions and not individual pixels, this segmentation is faster than conventional segmentation techniques.

At block 708, a 2-D graph cut segmentation is applied based on a local color model. A 2-D local boundary refiner 306, for example, may limit the boundary refinement to that contained in a user-selected window within a video frame. The selected window can be automatically propagated across frames of the video sequence, and the colors to be used for making decisions about refining the video object boundary can be limited to those within the window sequence. This can yield a much more precise video object boundary when the video object has fine detail at its visual edges.

CONCLUSION

The foregoing discussion describes exemplary systems and methods for video object cutting and pasting. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method comprising: automatically separating a video object from a background of a video sequence via a processor performing operations comprising:
  pre-segmenting frames of the video sequence into regions;
  selecting two model frames of the video sequence via a user interface, wherein each of the two model frames has a foreground representing the video object, and said background;
  constructing a 3-dimensional (3-D) graph from a 3-D volume of the frames temporally bounded by the two model frames, including associating regions on a single frame with adjacent regions on the same frame and associating the regions on the single frame with candidate corresponding regions on adjacent frames;

segmenting the 3-D graph into associated foreground regions and associated background regions separated by a boundary according to a global color model, wherein the associated foreground regions represent the video object in the frames of the video sequence and wherein segmenting the 3-D graph into associated foreground regions and associated background regions is achieved by minimizing a plurality of energy functions of the 3-D graph, wherein:

a first energy function represents the conformity of a color of a region to a foreground/background color model associated with the color information in the two model frame;

a second energy function represents color differences between two adjacent regions in the same frame; and a third energy function represents color differences between two regions in two adjacent frames;

specifying a video tube portion around a localized section of the boundary in the 3-D graph with the user interface, wherein the video tube comprises a subportion of a video frame and corresponding parts of at least one other video frame in the video sequence; and applying a local color model to a 2-dimensional (2-D) graph cut segmentation within the video tube portion to refine a localized boundary between the foreground regions and the background regions.

2. The method as recited in claim 1, wherein pre-segmenting frames uses one of a watershed technique or a tobogganing technique.

3. The method as recited in claim 1, wherein the associating the regions on the single frame with candidate corresponding regions on adjacent frames further includes associating a region on the single frame with regions on the adjacent frames that lie within a given radius of a likely corresponding position of the region on the adjacent frames.

4. The method as recited in claim 1, wherein the associating the regions on the single frame with candidate corresponding regions on adjacent frames further includes associating regions on the single frame with regions on the adjacent frames according to a color energy comparison between the regions on the single frame and the regions the adjacent frames.

5. The method as recited in claim 1, wherein the global color model includes foreground/background color distributions derived globally from the two model frames.

6. The method as recited in claim 1, wherein the specifying a video tube portion further includes specifying a first video tube window on a first frame and a second video tube window on a second frame, wherein at least one of the two model frames is between the first frame and the second frame.

7. The method as recited in claim 6, further comprising bidirectionally tracking one of the first or second windows through a part of the video sequence to automatically generate additional windows of the video tube on frames between the first frame and the second frame.

8. The method as recited in claim 7, further comprising overriding the 3-D segmentation and the 2-D segmentation by manually assigning foreground and background pixels of a video frame after one of the 3-D segmentation or the 2-D segmentation have taken place.

9. The method as recited in claim 1, further comprising applying a 2-D graph cut segmentation to each window of the video tube portion using local foreground and background color models derived from colors of one of the video tube windows in one of the two model frames.

10. The method as recited in claim 9, further comprising seamlessly connecting a refined boundary in a video tube window to a preexisting boundary adjacent to the video tube window.

11. The method as recited in claim 1, further comprising applying a modified coherent matting technique to separate the foreground regions from the background regions.

12. A computer readable medium having computer-executable instructions embodied thereon, the computer-executable instructions when executed on one or more processors configuring the one or more processors to perform the operations recited in claim 1.

13. A computer implemented method of automatically separating a video object from a background of a video sequence, comprising a processor performing:

pre-segmenting frames of the video sequence into regions;

selecting two model frames of the video sequence, wherein each of the two model frames has a foreground representing the video object, and said background;

constructing a 3-dimensional (3-D) graph from a 3-D volume of the frames temporally bounded by the two model frames;

segmenting the 3-D graph into associated foreground regions and associated background regions by minimizing an energy function of the 3-D graph, wherein the energy function to be minimized is represented by $$E(X) = \sum_{r \in V} E_1(x_r) + \lambda_1 \sum_{(r,s) \in A_I} E_2(x_r, x_s) + \lambda_2 \sum_{(r,s) \in A_T} E_3(x_r, x_s)$$

where $x_r$ and $x_s$ are foreground/background labels of region r and s respectively; $X = \{x_r : \forall_r\}$; $E_1$ represents the conformity of a color of region r to a foreground/background color model associated with the color information in the two model frames; $E_2$ represents color differences between two adjacent regions in the same frame; $E_3$ represents color differences between two regions in two adjacent frames; and $\lambda_1$ and $\lambda_2$ are constants.

14. A computer implemented method of separating a video object from a background of a video sequence, a processor performing steps in the method comprising:

pre-segmenting frames of the video sequence into regions;

selecting two model frames of the video sequence via a user interface, wherein each of the two model frames has a foreground representing the video object, and said background;

constructing a 3-dimensional (3-D) graph having two spatial dimensions and a third temporal dimension to form a 3-D volume of the frames temporally bounded by the two model frames, including associating regions on a single frame with adjacent regions on the same frame and associating the regions on the single frame with candidate corresponding regions on adjacent frames;

segmenting the 3-D graph into associated foreground regions and associated background regions separated by a boundary according to a global color model, wherein the associated foreground regions represent the video object in the frames of the video sequence;

refining a localized boundary between the video object and the background by a video tube engine by:

specifying a subportion of at least one video frame in the 3-D graph;

propagating the subportion across frames in the 3-D graph, defining a video tube; and applying a local color model to a local 2-dimensional (2-D) graph cut segmentation within the video tube; and seamlessly embedding the refined boundary into the existing segmentation by marking the pixels on the video tube boundary with a hard constraint.

15. The method of claim 14, wherein the 2-D graph cut segmentation is constructed at the pixel level by minimizing the sum of a first energy function representing the conformity of a color of a pixel to the local color model associated with the color information in the two model frames, and a second energy function representing the color differences between two adjacent pixels in the same frame.

16. The method of claim 14, wherein the 2-D graph cut segmentation is constructed at the pixel level, represented by:

$$E(X) \sum_{i \in \varsigma'} E_1(x_i) + \lambda'_1 \sum_{(i,j) \in A'_I} E_2(x_i, x_j)$$

where $x_i$ is the label of the pixel i, $\varsigma'74$ are all pixels being tracked, and $A'_I$ is the eight-neighbor relationship between pixels; $E_1$ represents the conformity of a color of pixel i to the local color model associated with the color information in the two model frames; $E_2$ represents color differences between two adjacent pixels in the same frame; and $\lambda_1'$ is a constant.

17. The method of claim 14, further comprising manually identifying a definite foreground region and a definite background region via a user interface.

18. The method of claim 14, wherein pre-segmenting frames uses one of a watershed technique or a tobogganing technique;

the segmenting the 3-D graph into associated foreground regions and associated background regions is achieved by minimizing an energy function of the 3-D graph;

the specifying a video tube portion further includes specifying a first video tube window on a first frame and a second video tube window on a second frame, wherein at least one of the two model frames is between the first frame and the second frame; and applying a modified coherent matting technique to separate the foreground regions from the background regions.

* * * * *